United States Patent
Kobayashi et al.

(10) Patent No.: US 6,964,822 B2
(45) Date of Patent: Nov. 15, 2005

(54) FUEL CELL CONTROL DEVICE AND FUEL CELL VEHICLE CONTROL APPARATUS

(75) Inventors: Tomoki Kobayashi, Utsunomiya (JP); Koji Kurosaki, Utsunomiya (JP); Yoshio Nuiya, Utsunomiya (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 294 days.

(21) Appl. No.: 10/150,222

(22) Filed: May 17, 2002

(65) Prior Publication Data
US 2002/0175010 A1 Nov. 28, 2002

(30) Foreign Application Priority Data
May 23, 2001 (JP) ...................... P2001-154542

(51) Int. Cl.$^7$ .......................... H01M 8/04; B60L 11/18
(52) U.S. Cl. ........................ 429/25; 429/22; 180/65.3
(58) Field of Search .............................. 429/22, 23, 25; 180/65.3

(56) References Cited

U.S. PATENT DOCUMENTS 5,780,981 A * 7/1998 Sonntag et al. ............. 318/139
6,175,217 B1   1/2001 Da Ponte et al.
6,815,106 B1  11/2004 Salvador et al.

FOREIGN PATENT DOCUMENTS

| DE | 4322765 C1 | 6/1994 |
| DE | 10118151 A1 | 12/2001 |
| EP | 0633157 B2 | 5/1997 |
| JP | 6-243886 * | 9/1994 |
| WO | WO 00/45455 A1 | 8/2000 |

* cited by examiner

Primary Examiner—Jonathan Crepeau
(74) Attorney, Agent, or Firm—Lahive & Cockfield, LLP; Anthony A. Laurentano, Esq

(57) ABSTRACT

A control apparatus for a fuel cell and a fuel cell vehicle is provided capable of controlling a fuel cell installed on a vehicle in an optimized condition. An ECU calculates a target generation current to be output by a current controller from the generation current of the fuel cell, based on a signal of an accelerator opening AC detected by the accelerator opening sensor and a signal of an atmospheric pressure detected by the atmospheric pressure sensor, and the target generation current is input into the current controller as the current command value. The current controller controls the generation current to be output from the fuel cell based on the current command value output from the ECU, that is, the generation command to the fuel cell.

2 Claims, 3 Drawing Sheets

FUEL CELL CONTROL DEVICE AND FUEL CELL VEHICLE CONTROL APPARATUS

BACKGROUND OF THE INVENTION

1. Field of the Invention

The present invention relates to a fuel cell control device and to a fuel cell vehicle control apparatus, and in particular relates to a technology for controlling operations of the fuel cell when a supply flow rate and a supply pressure of a reaction gases supplied to the fuel cell changes with atmospheric pressure change.

2. Description of the Related Art

Conventionally, a fuel cell stack (hereinafter, called a fuel cell) is constituted by a plurality of cells, each of which is formed by providing a pair of electrodes on opposite sides of a solid polymer electrolyte membrane. In this fuel cell, hydrogen as a fuel gas is supplied to an anode, and air as an oxidant gas is supplied to a cathode and hydrogen ions generated by the catalyst reaction at the anode move to the other electrode via the solid polymer electrolyte membrane. The hydrogen ions, after being transferred to the cathode cause a electrochemical reaction with oxygen at the cathode for generating electric energy.

The fuel cell as described above comprises an air compressor, for example, for supplying air to the cathode of the fuel cell, and a pressure flow rate control valve for supplying hydrogen to the anode of the fuel cell by use of the pressure of air as a signal pressure. That is, the fuel cell is designed so as to ensure a predetermined generation efficiency by setting the anode side reaction gas pressure at a predetermined pressure depending upon the cathode side pressure.

However, in a fuel cell according to one example of the conventional fuel cells, it is not possible to supply the reaction gases at a desired pressure and desired temperature, when the vehicle travels to locations at high altitude.

That is, as the altitude increases, the atmospheric pressure decreases and air becomes rarefied. Therefore, in order to acquire a desired amount of electric energy, it is necessary to increase the flow rate (mass flow rate) of the reaction gas and to maintain the pressure of the reaction gas at a predetermined pressure by increasing the rotation speed of the compressor. However, if it is required to increase the rotation of the compressor to an extent exceeding the capability of the air compressor, it becomes difficult to supply the reaction gas at a desired flow rate level and a desired pressure level.

In the state in which the reaction gas at a desired pressure and a desired flow rate is not supplied to the fuel cell, when the fuel cell is required to generate a predetermined electric current based on a predetermined generation command, a problem arises in the generation voltage of the fuel cell becomes unstable or the generation voltage falls too low far a predetermined voltage. Furthermore, since the generated current is output from the fuel cell while the reaction gas is insufficiently supplied, there is a possibility that the solid polymer membrane of the fuel cell will be deteriorated or that the long-term durability of the fuel cell will be degraded

BRIEF SUMMARY OF THE INVENTION

The present invention is made to solve the aforementioned problems.

A fuel cell control device according to the first aspect of the present invention comprising a reaction gas supply device (for example, the air compressor 21 described later in the embodiment) for supplying air as a reaction gas to a fuel cell, and atmospheric pressure detecting device (for example, the atmospheric pressure sensor 45 described later in the embodiment) for detecting the atmospheric pressure, a load (for example, the driving motor 13 and the motor 43 described later in the embodiment) which is driven by supply of electric power from the fuel cell, and a current control device (for example, the current controller 41 described later in the embodiment) for controlling a current value of a generated electric current output from the fuel cell to be supplied to the load in response to the atmospheric pressure detected by the atmospheric pressure device.

By constructing the fuel cell control device as described above, when the air becomes rarefied according to the decrease of the atmospheric pressure, the flow (mass flow) rate of air as the reaction gas to be supplied to the fuel cell decreases. In proportion to the decreasing amount of the reaction gas, the electric power obtainable by the fuel cell decreases. The current value of the generated current output from the fuel cell is controlled to an appropriate value (for example, a relatively small value) by the current control device. The above-described construction makes it possible to thereby prevent the fuel cell from malfunctioning, such as due to the generation voltage of the fuel cell shows unstable fluctuation or such that the generation voltage shows excessive drop, which results in controlling the fuel cell under the optimized conditions.

According to the second aspect of the present invention, a fuel cell vehicle control apparatus for controlling a fuel cell vehicle comprising a driving motor capable of driving a vehicle by an electric energy supplied by a fuel cell, comprising a reaction gas supply device (for example, the air compressor 21 described later in the embodiment) for supplying air as a reaction gas to said fuel cell, and an atmospheric detecting device (for example, the atmospheric pressure sensor 45 described later in the embodiment) for detecting an atmospheric pressure, a load (for example, the driving motor 13 and the motor 43 described later in the embodiment) which is driven by an electric power supply from said fuel cell, and a current control device (for example, the current controller 41 described later in the embodiment) for controlling a current value of a generated electric current output from the fuel cell to be supplied to the load in response to said atmospheric pressure detected by the atmospheric pressure detecting device and an accelerator opening determined by the accelerator pedal operation by the driver of the vehicle.

By constructing a fuel cell vehicle control apparatus as described above, the current value of the generated current output from the fuel cell is controlled to an appropriate value by the current control device, based on the accelerator opening and the atmospheric pressure. Accordingly, even when the vehicle travels to located at high altitude, since the current value of the generated current to be supplied to the load can be modified to a smaller value, it is possible to prevent malfunctions of the fuel cell such that the generation voltage of the fuel cell shows unstable fluctuation or such that the generation voltage shows excessive drop; the above construction thereby makes it possible to prevent the fuel cell from losing the long-term durability.

DETAILED DESCRIPTION OF THE INVENTION

Hereinafter, a fuel cell control device and a fuel cell vehicle control apparatus of according to one embodiment of the present embodiment is described with reference to the attached drawings.

Figure 1:
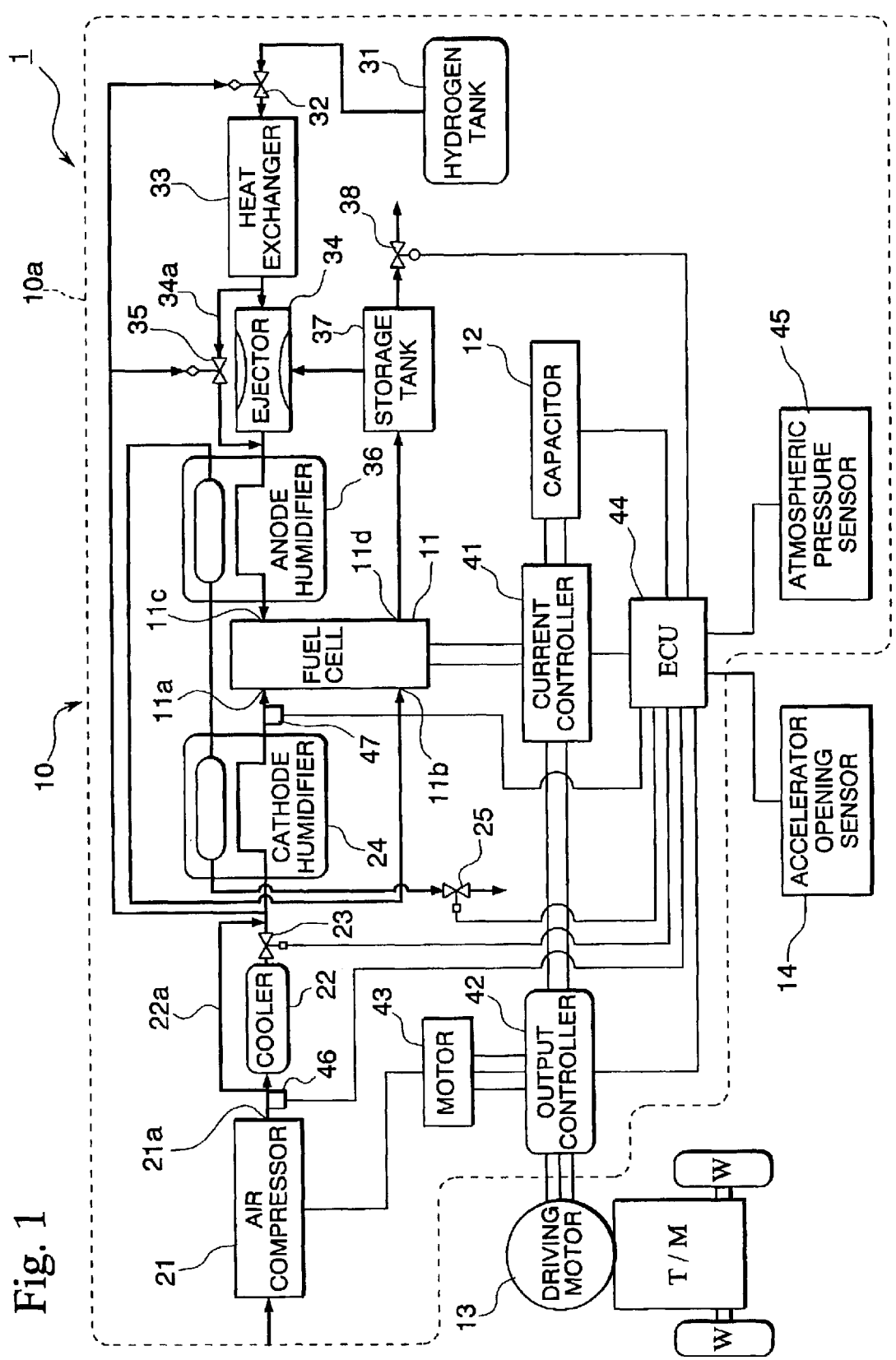
FIG. 1 is a diagram showing the structure of the fuel cell vehicle control apparatus provided with the fuel cell control device according to one embodiment of the present invention.

FIG. 1 is a diagram showing the structure of the fuel cell vehicle control apparatus 10 provided with the fuel cell control device 10a according to one embodiment of the present invention.

The fuel cell vehicle 1 according the present embodiment of the present invention is provided with a hybrid type power source apparatus comprising a fuel cell 11, a battery device such as a capacitor 12. A driving force of a drive motor 13, generated by supply of the electric power supplied from the aforementioned power source apparatus, is transmitted to the driving wheels W through a transmission T/M comprised of an automatic transmission or a manual transmission.

When a driving force is transmitted from the driving wheels W to the drive motor 13 when the vehicle is decelerating, the drive motor acts as a generator for generating a regenerative braking. Consequently, the kinetic energy of the vehicle is recovered as electrical energy.

The fuel cell vehicle control apparatus 10 according to the present invention comprises a fuel cell control device 10a, a drive motor 13, and an accelerator opening sensor 14 for detecting an opening degree of the accelerator (that is, intention of acceleration) determined by the accelerator pedal operation of the driver of the vehicle.

Furthermore, the fuel cell control device 10a is constituted by, for example, a fuel cell 11, a capacitor 12, an air compressor 21, a cooler 22, a cooler bypass control valve 23, a cathode humidifier 24, a back pressure control valve 25, a hydrogen tank 31, a fuel supply control valve 32, a heat exchanger 33, an ejector 34, an ejector bypass control valve 35, an anode humidifier 36, a storage tank 3, an exhaust control valve 38, a current controller 41, an output controller 42, a monitor 43, a central control unit (ECU) 44, an atmospheric pressure sensor 45, a flow rate sensor 46, and a pressure sensor 47.

The fuel cell 11 is constituted by a stack of a plurality of fuel cells, each of which is formed by sandwiching from both sides of solid polymer electrolyte membrane by the anode and cathode, and the fuel cell comprises a hydrogen electrode for supplying hydrogen as a fuel and an air electrode for supplying air containing air as the oxidant gas. Hydrogen ions generated at the anode electrode by a catalytic reaction is moved to the cathode, wherein the hydrogen ions react with oxygen by an electrochemical reaction, and electric power is generated.

The air electrode of the fuel cell comprises an air supply port 11a for supplying air from the air compressor 21, which corresponds to the oxidant gas supply portion, and an air exhaust port 11b for exhausting air in the air electrode. The hydrogen electrode, in contrast, comprises a hydrogen supply port 11c for supplying hydrogen from a hydrogen tank, constituting a fuel supply portion, and a hydrogen exhaust port 11d for exhausting hydrogen in the hydrogen electrode.

The air compressor 21 executes adiabatic compression for air that is introduced externally from the vehicle and the compressed air is not only supplied to the air electrode as a reaction gas but also supplied, as a pressure signal, to the fuel supply control valve 32 and to the ejector bypass control valve 35, which are described in detail in the later section.

After being compressed and heated by the air compressor 21, the air can be cooled by supplying it to the cooler 22. In accordance with the driving condition of the fuel cell, the air after being cooled to a predetermined temperature by the cooler is supplied to the cathode humidifier 24, fuel supply control valve 32, and ejector bypass control valve 35.

A cooler bypass passage 22a is provided which detouring the cooler 22 and the cooler bypass control valve 23, for example, which is disposed downstream of the cooler 22, on a passage connecting between the air compressor 21 and the cathode humidifier 24, and on a passage connecting the fuel supply control valve 32 and the ejector bypass control valve 35.

Accordingly, depending upon the driving condition of the fuel cell 11, it is possible to directly supply the air after being compressed and heated by the air compressor 21 to the fuel cell 11 without cooling by closing the cooler bypass control valve 23.

The cathode humidifier 24 is constructed of a water permeable membrane such as, for example, a hollow fiber membrane, and uses the exhaust air exhausted from the air exhaust port 11b of the fuel cell 11 for humidifying air to be supplied to the fuel cell 11 as the reaction gas. That is, when air and the exhaust air are contacted through a water permeable membrane, the water content (especially, water vapor) in the exhaust air is supplied to air as water vapor after permeating through the water permeable membrane.

The humidified water is supplied to the fuel cell 11 and maintains an ionic conduction state of the solid polymer electrolyte membrane at a predetermined state.

Note, as described below, that the exhaust air exhausted from the air exhaust port 11b of the fuel cell 11 is supplied in sequence to the anode humidifier 37 and the cathode humidifier 24 as the humidifying gas, and the exhaust gas exhausted from the cathode humidifier 24 is discharged to the outside of the vehicle through the back pressure control valve 25.

The ECU 44 controls the opening or closing operations of the back pressure control valve 25, depending on the driving conditions of the fuel cell, and the degree of valve opening of the back pressure control valve is set depending on the control signal input from the ECU 44, so that the pressure of the air to be supplied to the fuel cell 11 is controlled to be at a predetermined pressure.

Hydrogen as the fuel for the fuel cell 11 is supplied from, for example, a high pressure hydrogen tank 31 to the fuel supply control valve 32.

The fuel supply control valve 32 is constituted by, for example, a pneumatic proportional control valve, and the pressure of hydrogen at the outlet of the fuel supply control valve 32 after passing through the fuel supply control valve 32 is set within a predetermined pressure range in response to the signal pressure.

Hydrogen after passing through the fuel supply control valve 32 is supplied to the heat exchanger 33. In the heat exchanger, the temperature of hydrogen is set at a predetermined temperature through a heat exchange with, for example, a cooling agent, and hydrogen after the heat exchange is supplied to the hydrogen electrode of the fuel cell 11 after sequentially passing through the ejector 34 or the ejector bypass control valve 35, and an anode humidifier 36.

The unreacted exhaust gas exhausted from the fuel cell is introduced to the ejector 34 through a storage tank 37, and hydrogen supplied from the heat exchanger 33 and exhaust gas from the fuel cell 11 are mixed and supplied again to the fuel cell 11.

The ejector 34 absorbs the exhaust gas from the fuel cell by a negative pressure generated in the vicinity of a high speed hydrogen gas stream and the exhaust hydrogen is then mixed with hydrogen supplied through the heat exchanger 33 and supplied again to the fuel cell, forming a exhaust gas circulation cycle.

An ejector bypass passage 34a, which detours the ejector 34, is provided on the passage connecting the heat exchanger 33 with the anode humidifier 36.

In the ejector bypass passage 34a, an ejector bypass control valve 35, corresponding to a pneumatic proportional pressure control valve is disposed in parallel to the ejector 34, and the pressure of hydrogen at the outlet of the fuel supply control valve 32, that is, the fuel supply pressure, after passing through the fuel supply control valve 32 is set within a predetermined pressure range in response to the signal pressure when the air pressure supplied from the air compressor is used as the signal pressure.

That is, the pressure and flow rate characteristics of hydrogen passing the ejector 34 is controlled so as to enter within a predetermined state by the pressure and flow rate control at the fuel supply control valve 32 and the ejector bypass control valve 35, setting the pressure of air corresponding to the oxidant gas as the standard. The above process means that the pressure difference between the pressure of the oxidant gas (air supply pressure) and the pressure of the fuel (fuel supply pressure) for the solid polymer electrolyte membrane, that is, the electrode pressure difference between the pressure to fuel electrode pressure and the pressure to the air electrode is controlled so as to enter within a predetermined pressure difference.

The anode humidifier 36 is constituted by a water permeable membrane such as a hollow fiber membrane. The exhaust air exhausted from the air exhaust port 11b of the fuel cell 11 is utilized as the humidifying gas for humidifying hydrogen. That is, when hydrogen is contacted with the exhaust air through the water permeable membrane, the water content (in particular, water vapor) in the exhaust air is supplied to hydrogen after the water content passes through the pores in the water permeable membrane.

The humidified hydrogen is supplied to the fuel cell 11 and the ionic conductivity of the solid polymer electrolyte membrane is thus maintained at a predetermined state.

The storage tank 37 performs gas-liquid separation for the exhaust gas exhausted from the hydrogen exhaust port 11d of the fuel cell 11, and after the liquid water contained in the exhaust gas is separated, the gas is stored in the tank 37.

The opening and closing state of the exhaust control valve 38 is controlled by the ECU44, and excess water content (mainly, liquid water) is discharged to the outside of the vehicle.

The generated electric current output from the fuel cell 11 is input into the current controller 41, and the current controller 41 is connected to a capacitor 12 such as an electric double layer capacitor or an electrolytic capacitor, which forms a battery device.

The fuel cell 11 and the capacitor 12 are connected in parallel to a motor 13 for diving the vehicle and a motor 43 for driving the air compressor 21, constituting electrical loads, through the current controller 41 and the output controller 42.

The current controller 41 is constructed by providing with, for example, a DC-DC hopper, and controls the value of the current generated by the fuel cell 11.

The output controller 42 is provided with a PWM inverter comprised of a switching elements, such as IGBT. As described later, the current controller 42 converts the DC currents output from the fuel cell 11 and the capacitor 12 to the three phase alternative currents for supplying to the driving motor or to the compressor, based on a torque command for the driving motor or a rotation speed command to the air compressor 21.

The driving motor 13 and the motor 43 are formed by the permanent magnet-type three-phase current synchronous motor using a permanent magnet to produce a magnetic field, and these motors are controlled by the three-phase alternative current power supplied from the output controller 42.

ECU 44 calculates a remaining charge (state of charge) of the capacitor based on the output current, the terminal voltage, and the temperature output from the capacitor 12, that is, the battery device, and controls the supply current to the loads comprised of the driving motor 12 or the motor 43.

Furthermore, ECU 44 controls the power conversion operations of the PWM inverter provided with the output controller 42 and calculated the torque command for the driving motor 13 based on the signal of the accelerator opening determined by the amount of depressing operation of the accelerator pedal by the driver. By inputting the torque command to the output controller 42, a pulse width modulation signal in response to the aforementioned torque command is input to the PWM inverter and the phase currents for generating a required torque are input to each phase of the driving motor 13.

In addition, as described later, ECU 44 calculates a rotation number N of the compressor 21 as the required value for determining the flow rate of the reaction gas, based on the signal related to the accelerator opening AC and the signal related to the atmospheric pressure detected by the atmospheric pressure sensor 45, and ECU 44 calculates a valve opening θ of the back pressure control valve as the required pressure for the pressure of the reaction gas. The input of the rotation number N allows to input the phase current corresponding to the rotation number N to each phase. The input of the calculated valve opening θ into the back pressure control valve allows to control the valve opening of the back pressure control valve.

In addition, ECU 44 performs a feed-back control such that the differences between each required flow rate and the pressure of the reaction gas and the actual flow rate and the actual pressure of the reaction gas supplied to the fuel cell 11 are controlled to zero.

At the time of the above control, ECU 44 calculates a target generating current P to be output from the fuel cell 11 by the current controller 41, based on the signal of the accelerator opening AC and the signal of the atmospheric pressure PA and the target generation current P of the fuel cell is input into the current controller 41 as the current command value IFC.

Various signals are into the ECU44, such as a detected signal of the accelerator opening AC from the output of the accelerator opening sensor determined by the amount of the depressing operation of the accelerator pedal by the driver, a detected signal of the atmospheric pressure PA from the output of the atmospheric pressure sensor 45, a signal in terms of the flow rate detected value QN from the flow rate sensor 46 for detecting, for example, the flow rate (mass flow rate) of air supplied from the air compressor 21, and a signal of the pressure detector N output from the pressure detector 47 for detecting the pressure of air supplied to the air electrode of the fuel cell 11.

Note that the flow rate sensor 46 are provided in the vicinity of the air discharge port 21a of the air compressor 21, and the pressure sensor 47 is provided in the vicinity of the air supply port 11a of the fuel cell 11.

The fuel cell vehicle control apparatus 10 according to the present embodiment of the present invention is formed by the above construction and the operations of the above-described fuel cell vehicle control apparatus 10 and, in particular, a procedure for setting a current value of the generating current output by the current controller 41 of the fuel cell 11 depending on the atmospheric pressure will be described below with reference to attached figures.

Figure 2:
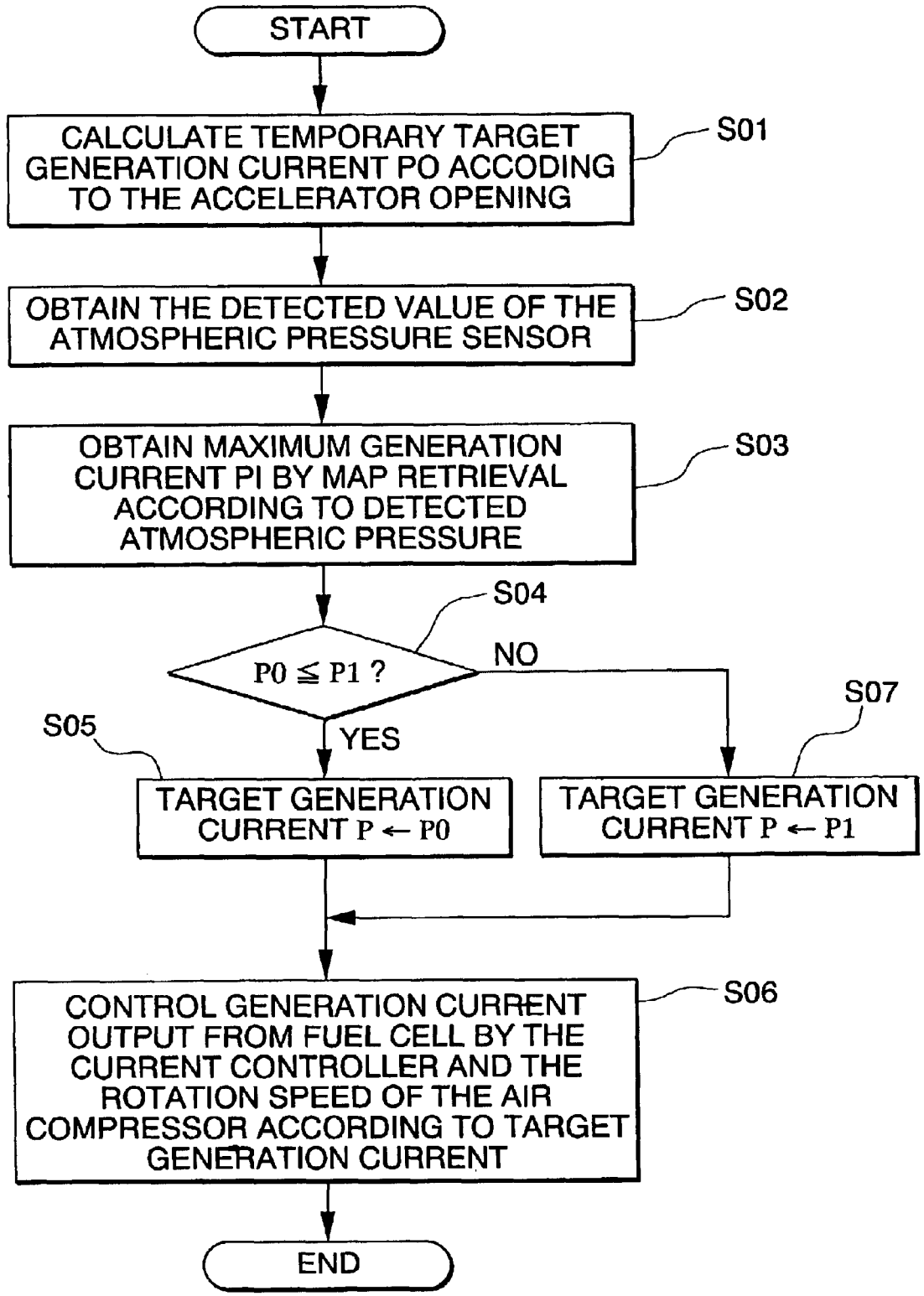
FIG. 2 is a flowchart showing operations of the fuel cell control device, and in particular, showing the procedure to set a target generating current P by the fuel cell.
Figure 3:
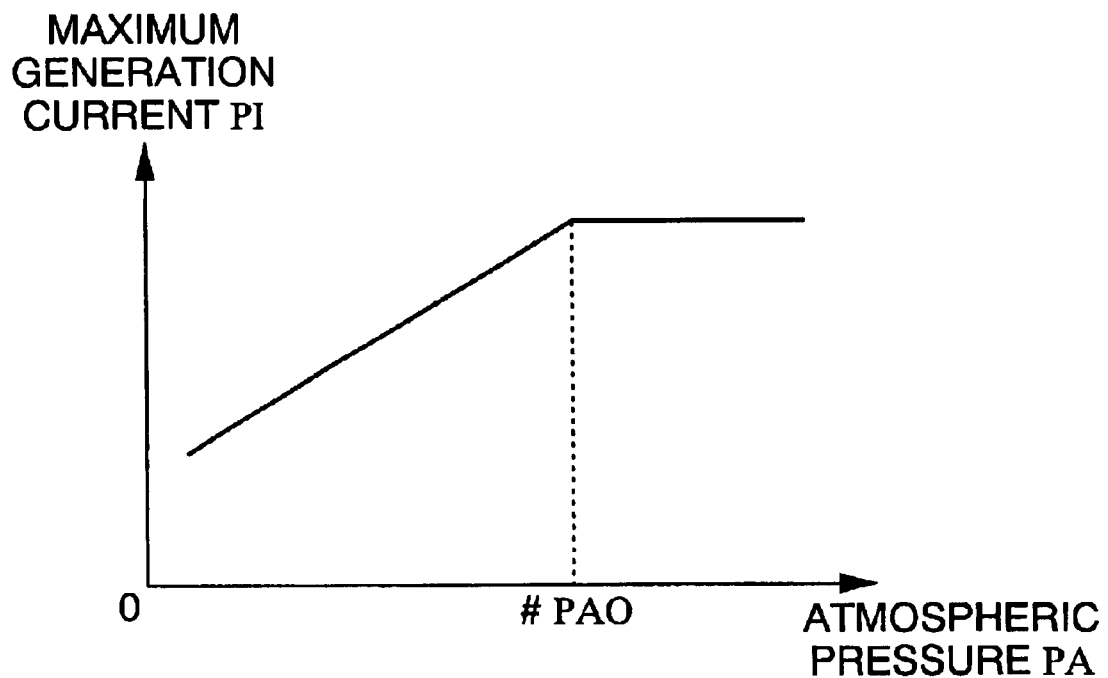
FIG. 3 is a graph showing the change of the maximum generating current PI of the fuel cell according to the change of the atmospheric pressure.

FIG. 2 is a flowchart of operations for controlling the fuel cell vehicle control apparatus 10, especially a flowchart for setting a target generating current depending on the atmospheric pressure. FIG. 3 is a graph showing a change of the maximum generating current PI with a change of the atmospheric pressure.

In step S01 shown in FIG. 2, a temporary target generating current P0 to be output from the fuel cell 11 is obtained by retrieving, for example, a predetermined map containing preset values, based on a signal of the accelerator opening determined by a depressing operation of the accelerator pedal by the driver.

In step S02, a signal of an atmospheric pressure PA detected by the atmospheric pressure sensor 45 is obtained.

Subsequently, in step S03, a maximum generating current PI in response to the atmospheric pressure PA measured by the atmospheric pressure sensor 45 is obtained by retrieving a predetermined map, which shows a relationship between the atmospheric pressure PA and the maximum generating current PI.

Note that the map shown in FIG. 3 shows that the maximum generating current PI changes to decrease as the atmospheric pressure PA decreases when the atmospheric pressure is below a predetermined pressure #PA0, and when the atmospheric pressure exceeds a predetermined pressure of #PA0, the atmospheric pressure is set at a predetermined maximum value.

Subsequently, in step S04, it is determined whether the temporary target generating current value P0 is less than the maximum generating current value PI.

When the determination is "NO", the flow proceeds to step S07, which is described later.

When the determination is "YES", the flow proceeds to step S05.

In step S05, the target generating current value P is set to the temporary target generating current value P0, and the flow proceeds to step S06.

In step S06, the rotation speed of the air compressor 21 is controlled so as to generate the target generating current value P, wherein the current controller 41 controls the generating current output from the fuel cell 11, and the flow is completed.

In contrast, in step S07, the target generating current value P is set to the maximum generating current value PI, and the flow proceeds to step S06, wherein the generating current to be output from the fuel cell 11 is controlled by controlling the rotation number N of air compressor 21 and the current controller 41.

That is, the target generating current value is set to a smaller value as the atmospheric pressure PA decreases, and accordingly, the rotation number of the air compressor 21 is reduced in order to reduce the flow rate of air to be supplied to the fuel cell 11, and the generating current output from the fuel cell 11 by the current controller 41 is limited to a relatively small value.

As described above, the fuel cell control device 10a according to the present embodiment of the present invention, since the target generating current value P is set as the generating current to be output from the fuel cell, based on the detected signal of the atmospheric pressure output from the atmospheric pressure sensor 45, even when the feasible generation power of the fuel cell 11 decreases because the atmospheric pressure decreases and the air becomes rarefied, the generating current to be output by the current controller 41 from the fuel cell 11 can be limited within a proper current range, and the fuel cell 11 can be protected by being prevented from entering in an abnormal power generation state.

According to the fuel cell vehicle control apparatus 10 according to the present embodiment, since the generating current of the fuel cell 11 is set not only by the detected signal of the atmospheric pressure PA by the atmospheric pressure sensor 45 but also by the detected signal of the accelerator opening è associated with the accelerator pedal operation by the driver of the present vehicle, the generating current supplied to the load can be changed to a smaller value as the atmospheric pressure decreases, when the vehicle travels on a location where the altitude is high.

It is thereby possible to prevent the fuel cell 11 from generating excess generating current when the flow (mass flow) rate of the reaction gas to be supplied to the fuel cell 11 is reduced, and it is also possible to preserve the long-term reliability of the fuel cell by preventing malfunctions of the fuel cell 11 so as to cause unstable fluctuation of the generation voltage or to cause excessive drop of the generation voltage.

As described above, in the present embodiment, the fuel supply control valve 32 and the ejector bypass control valve 36 are limited to the air-operated proportional control valves. However, these valves are not limited to the air operated type valves, and various types of valves may be used in which opening and closing operations are controlled by control signals input from the ECU 44.

As shown in step S03, in the present embodiment, the maximum generating current value PI is obtained by retrieving a map showing a relationship between the atmospheric pressure PA and the maximum generating current value PI. However, the maximum generating current PI may be obtained by calculating a predetermined equation which shows the relationship between the atmospheric pressure PA and the maximum generating current value PI.

In the present embodiment, as shown above in step S04, the target generating current value P is set either to one of the temporary target generating current value P0 or the maximum generating current value PI depending upon whether the target generating current value is less than the maximum generating current value PI. However, acquisition of the target generating current value P is not limited to the above method and the value P may be obtained, as shown in FIG. 4, by preparing a map in advance showing the change of the target generating current value P by the change of the accelerator opening according to the change of the atmospheric pressure and by obtaining the generating current value (supply generating current PS) based on the accelerator opening PA associated with the accelerator pedal operation by the driver of the present vehicle and the atmospheric pressure detected by the atmospheric pressure sensor 45.

Figure 4:
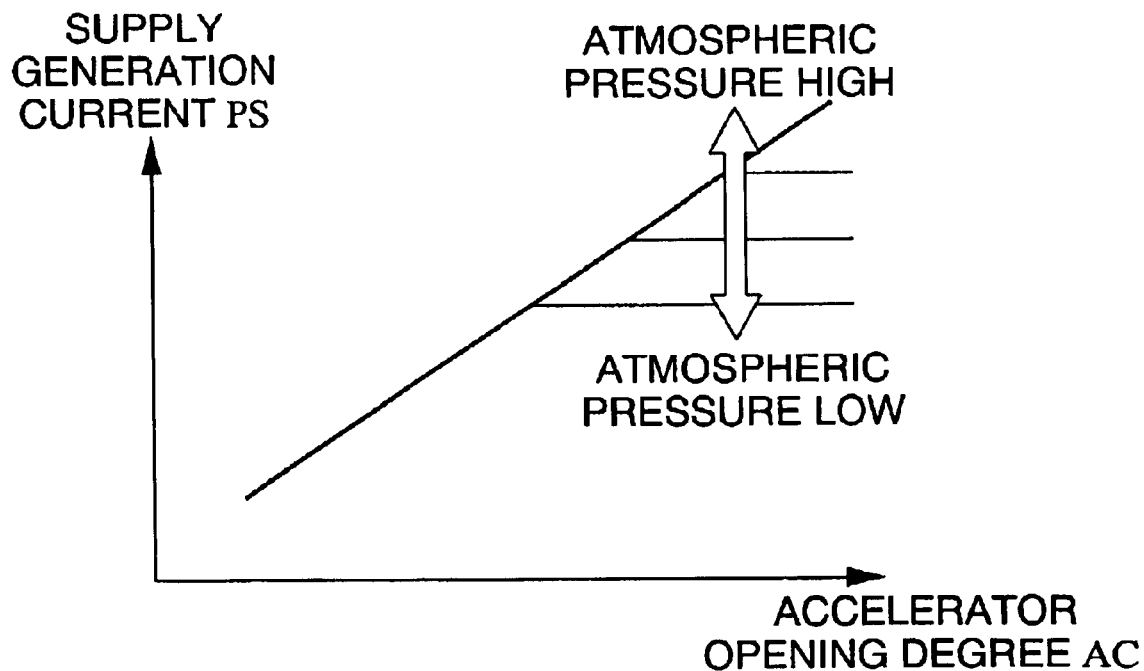
FIG. 4 is a graph showing the change of the supply generating current value PS according to an opening degree of an accelerator depending on the atmospheric pressure.

That is, as shown in FIG. 4, the upper limit value of the supply generating current value Ps is set to a reduced value in accordance with the decrease of the atmospheric pressure PA, and the accelerator opening is set to a reduced value when the supply generating current value PS reaches the upper limit value.

As explained above, the fuel cell control device according to the first aspect controls to decrease the flow (mass flow) rate of air as the reaction gas to be supplied to the fuel cell when the air becomes rarefied according to the decrease of the atmospheric pressure. Since the electric power obtainable by the fuel cell decreases as the air supply decreases, the current value of the generated current from the fuel cell is controlled to an appropriate value (for example, a relatively small value) by the current control device. Therefore, it is possible to thereby prevent the fuel cell from falling in malfunctions such that the generation voltage of the fuel cell shows unstable fluctuation or such that the generation voltage shows excessive drop, which results in controlling the fuel cell under the optimized conditions.

The fuel cell vehicle control apparatus according to the second aspect controls the current value of the generated current output from the fuel cell to an appropriate value by the current control device, based on the accelerator opening and the atmospheric pressure. Accordingly, even when the vehicle travels on a location at high altitude, since the current value of the generated current to be supplied to the load can be modified to a smaller value, it is possible to prevent malfunctions of the fuel cell such that the generation voltage of the fuel cell shows unstable fluctuation or such that the generation voltage shows excessive drop; thereby, the above construction makes it possible to prevent the fuel cell from losing the long-term durability.

What is claimed is:

1. A fuel cell control device, comprising:
   a reaction gas supply device for supplying air as a reaction gas to a fuel cell, and an atmospheric pressure detecting device for detecting the atmospheric pressure;
   a load which is driven by supply of electric power from the fuel cell; and
   a current control device for receiving a generated electric current output from the fuel cell and controlling a current value of the generated electric current output from the fuel cell to be supplied to the load in response to said atmospheric pressure detected by said atmospheric pressure device.

2. A fuel cell vehicle control apparatus for controlling a fuel cell vehicle comprising a driving motor capable of driving a vehicle by electric energy supplied by a fuel cell, comprising:
   a reaction gas supply device for supplying air as a reaction gas to said fuel cell, and an atmospheric detecting device for detecting an atmospheric pressure;
   a load which is driven by an electric power supply from said fuel cell; and
   a current control device for receiving a generated electric current output from the fuel cell and controlling a current value of the generated electric current output from the fuel cell to be supplied to the load in response to said atmospheric pressure detected by said atmospheric pressure detecting device and an accelerator opening determined by an accelerator pedal operated by the driver of the vehicle.

* * * * *